United States Patent
Provan et al.

(10) Patent No.: US 6,539,337 B1
(45) Date of Patent: Mar. 25, 2003

(54) EMBEDDED DIAGNOSTIC SYSTEM AND METHOD

(75) Inventors: Gregory Provan, Newbury Park, CA (US); Adnan Darwiche, Los Angeles, CA (US)

(73) Assignee: Innovative Technology Licensing, LLC, Thousand Oaks, CA (US)

( * ) Notice: Subject to any disclaimer, the term of this patent is extended or adjusted under 35 U.S.C. 154(b) by 212 days.

(21) Appl. No.: 09/594,648

(22) Filed: Jun. 15, 2000

(Under 37 CFR 1.47)

(51) Int. Cl.[7] .................................................. G06F 11/08
(52) U.S. Cl. ........................................ 702/183; 714/30
(58) Field of Search .............................. 702/183, 182, 702/184, 185, 188, 57, 58, 59, 81, 84; 700/9, 17, 19, 26, 108–110; 707/3, 4; 714/25, 26, 30, 48

(56) References Cited

U.S. PATENT DOCUMENTS

| | | | | | |
|---|---|---|---|---|---|
| 4,497,059 | A | * | 1/1985 | Smith | 714/797 |
| 4,634,110 | A | * | 1/1987 | Julich et al. | 700/2 |
| 5,260,874 | A | * | 11/1993 | Berner et al. | 434/242 |
| 5,544,308 | A | * | 8/1996 | Giordano et al. | 706/45 |
| 5,701,456 | A | * | 12/1997 | Jacopi et al. | 345/841 |
| 6,208,955 | B1 | * | 3/2001 | Provan et al. | 703/20 |

FOREIGN PATENT DOCUMENTS

| | | |
|---|---|---|
| EP | 0404992 B1 | 6/1989 |
| GB | 2342479 A | 12/2000 |

OTHER PUBLICATIONS

Utilizing Device Behavior in Structure–Based Diagnosis, Adnan Darwiche, XP–002207092, Cognitive Systems Laboratory Department of Computer Science, UCLA.

Adnan Darwiche and Gregory Provan, *Query DAGs: A Practical Paradigm for Implementing Belief–Network Inference* Proc. Conf. on Uncertainty in AI 1996.

Adnan Darwiche, *Model–Based Diagnosis Using Structured System Desceiptions*, published 6/98, Journal of Artifical Intelligence Research 8 (1998) 165–222.

* cited by examiner

*Primary Examiner*—Marc S. Hoff
*Assistant Examiner*—Edward Raymond
(74) *Attorney, Agent, or Firm*—Koppel, Jacobs, Patrick & Heybl (57) ABSTRACT

An embedded real time diagnostic system that is applicable to fault detection and isolation in host systems having repetitive subsystems. A query directed acyclic graph (Q-DAG) for one of each type of repetitive subsystem is compiled off-line from a causal network model and is stored in host system computer memory. When a fault in the host system is detected by the computer, a replicating program replicates the necessary subsystem Q-DAGs to construct an overall host system Q-DAG. A data table which contains information on how the various Q-DAGs are linked based on the hardware architecture of the host system, is also accessed by the computer. The data table contains a matrix which dictates which Q-DAGs are linked, and Q-DAG level information on the Q-DAG nodes and which nodes are linked to nodes in other Q-DAGs. The new diagnostic system uses less memory and processor throughput while still providing full system diagnostics.

13 Claims, 10 Drawing Sheets

| Block | Behavior | Symbol |
|---|---|---|
| Data Producer | IF mode is OK THEN O is Data<br>IF mode is Faulty THEN O is NoData | Data Producer →O |
| MUX | IF I1 is Data OR I2 is Data THEN O is Data<br><br>IF I1 is NoData AND I2 is NoData THEN O is NoData | I1→ MUX →O<br>I2→ |
| Data Filter | IF Control In is True AND Data In is Data THEN Data Out is Data<br><br>IF Control In is True AND Data In is NoData THEN Data Out is NoData<br><br>IF Control In is False THEN Data Out is NoData | Control In→ Data Filter →Data Out<br>Data In→ |
| Data Pass-through | IF mode is OK AND I is Data THEN O is Data<br>IF mode is OK AND I is NoData THEN O is NoData<br>IF mode is Faulty THEN O is NoData | I→ Data Pass-through →O |

| Bus | IF mode is OK THEN O is equal to I<br>IF mode is Faulty THEN O is NoData | I→ Bus →O |

|       | [X,1] | [X,2] | [X,3] | [Y,1] | [Y,2] | [Y,3] | [Y,4] | [Y,5] | [Y,6] | [Z,1] | [Z,2] | ... | [Z,12] |
|-------|-------|-------|-------|-------|-------|-------|-------|-------|-------|-------|-------|-----|--------|
| [X,1] |       | 1     | 1     |       |       |       |       |       |       |       |       |     |        |
| [X,2] |       |       | 1     |       |       |       |       |       |       |       |       |     |        |
| [X,3] |       |       |       | 1     | 1     |       |       |       |       |       |       |     |        |
| [Y,1] |       |       |       |       | 1     | 1     |       |       |       |       |       |     |        |
| [Y,2] |       |       |       |       |       | 1     | 1     |       |       |       |       |     |        |
| [Y,3] |       |       |       |       |       |       | 1     | 1     |       |       |       |     |        |
| [Y,4] |       |       |       |       |       |       |       | 1     | 1     |       |       |     |        |
| [Y,5] |       |       |       |       |       |       |       |       | 1     | 1     |       |     |        |
| [Y,6] |       |       |       |       |       |       |       |       |       | 1     | 1     |     |        |
| [Z,1] |       |       |       |       |       |       |       |       |       |       | 1     | ... |        |
| ...   |       |       |       |       |       |       |       |       |       |       |       |     |        |
| [X,1] |       |       |       |       |       |       |       |       |       |       |       |     | 1      |
| [X,1] |       |       |       |       |       |       |       |       |       |       |       |     | 1      |

EMBEDDED DIAGNOSTIC SYSTEM AND METHOD

BACKGROUND OF THE INVENTION

1. Field of the Invention

This invention relates to an embedded diagnostic system and method for use in computer based systems having repetitive or redundant subsystems.

2. Description of the Related Art

Modern electronic systems such as aircraft avionics systems can have numerous electrical and electronic subsystems used for communications, navigation, aircraft control, remote sensing, power distribution, life support, electronic warfare, various sensors, etc. As the complexity of these systems increases the number of potential faults generally increases. Also, the relationship between the various subsystems and a fault signal are increasingly complex, making it more difficult to determine the actual cause of the fault signal. As a result, modern diagnostic systems can require significant analysis to isolate the cause of a fault signal.

Real time embedded diagnostic software systems have been developed to detect and isolate faults in computer based systems ("host systems") during operation. The host systems have a central or maintenance computer which has the memory to store the diagnostic software, and a processor to conduct the system diagnostics. The central computer accepts fault signals from the various sub-systems and executes the diagnostic software to make a determination as to the likely cause of the fault. However, as the complexity of modern systems increases the complexity of the diagnostic software has also increased and can require a prohibitive amount or memory and/or computer processor throughput. To meet these limitations, system developers are often required to scale back the scope or depth of the diagnostic software system.

One common approach to real time embedded diagnostics is to develop a causal network model based on the behavioral characteristics of the various sub-systems comprising the overall host system. [Darwiche, A. 1998. Model-based Diagnosis Using Structured System Descriptions. *J. of AI Research*, 8:165–222, June 1998]. A causal network model provides a ranked set of diagnoses for the particular host system, given the inputs and outputs of the various sub-systems, line replaceable units (LRUs), sensors, or other components. In operation, the causal network, along with a causal network inference code, are loaded into the memory within the system's central computer. The central computer accepts inputs from the systems that may indicate a fault, and uses the inputs in conjunction with the causal network to compute the probability distributions in relation to fault variables. The causal network is then interrogated using an inference code, and a likely cause of the fault is generated. All of these steps are completed while the host system is operating. One disadvantage with this approach is that the causal network and inference code consume a large amount of memory and require substantial processor throughput to enable inference to be done quickly, especially for real-world diagnostic systems (e.g. networks that could self-diagnose a reasonable number of faults in a system). Depending on the system, there may not be sufficient memory or throughput to implement this process.

To overcome these difficulties a more flexible approach was devised for implementing the causal network approach using query directed acyclic graphs (Q-DAGs). In causal networks, most of the work performed by the standard algorithms are independent of the specific evidence gathered about the fault variables. That is, there is generally no difference between algorithmic runs with different values for the variables, and the algorithm will not branch differently on any of the key decisions that it makes. Therefore, a standard inference algorithm can be applied to a causal network with variables being parameters instead of specific values. The result returned by the algorithm is a Q-DAG which is an arithmetic or logical expression with some parameters that depend on specific evidence. [See Darwiche A. supra., and Adnan Darwiche, Gregory M. Provan: Query DAGS: A Practical Paradigm for Implementing Belief-Network Inference. *J. of AI Research* 6:147–176, 1997].

One of the advantages of this approach is that the Q-DAG is typically compiled off-line using a given causal network, a set of variables about which evidence may be collected (evidence variables), and a set of variables for computing probability distributions (query variables). The Q-DAG and an evaluator specific to the host system are stored in the host system memory and are used to evaluate detected faults on-line; i.e. during operation of the host system. Given evidence regarding system faults, the Q-DAG is evaluated using simple arithmetic or logical operations rather than a complicated causal network inference. This approach reduces the memory requirements and the computational work needed to perform this on-line diagnostic evaluation, and is easily implemented in different software and hardware platforms.

In conventional diagnostic systems a diagnostic program for the entire host system must be generated and stored in memory. In systems using Q-DAG based diagnostics, a Q-DAG for the entire system is compiled off line and stored in the host system processor memory along with its inference algorithm.

Despite these improvements in memory and throughput requirements, the Q-DAG approach can still consume prohibitive amounts of memory and processor throughput. For example, some modern commercial aircraft have complex passenger entertainment systems with numerous subsystems and components. Often, the computer responsible for running the diagnostic system for the entertainment system is also dedicated to performing other tasks that utilize nearly all of its throughput and memory. Accordingly, there is little throughput or memory that can be devoted to the diagnostic system. In other systems, the computer running the diagnostics is simply not powerful enough to adequately store and perform diagnostics using Q-DAGs.

Despite these limitations, many host systems still require embedded, real-time diagnostic systems for quick and efficient real time fault detection and isolation. This is particularly true for commercial aircraft that are generally under strict turnaround requirements for aircraft repair.

SUMMARY OF THE INVENTION

The present invention provides a new embedded real time Q-DAG based diagnostic system which uses minimal memory and processor throughput while still providing full system diagnostics. The invention is applicable to fault detection and isolation in host systems having redundant or repetitive subsystems. Using the present invention in host systems having repetitive architecture, the stored Q-DAG need only represent a single instance of each portion of a system in which that portion occurs repeatedly. In addition, algorithms relating to how the different repetitive subsystems are connected are generated and stored with the Q-DAGs.

For example, if the architecture can be divided into four identical and repetitive subsystems, only one Q-DAG representing one of the four subsystems needs to be compiled and stored in memory within the host system. If a fault is detected in the first subsystem, the stored Q-DAG can be interrogated to determine the likely cause of the fault. If a fault is detected in one of the other subsystems, the necessary number of Q-DAGs are replicated using a replicating program that is also stored in memory within the host system. If a fault is detected at the third repetitive section, two additional Q-DAGS are replicated from the stored Q-DAG. The diagnostic system will then have sufficient Q-DAGs to determine the likely cause of the detected fault. Only the necessary number of Q-DAGs are replicated to diagnose the particular fault, which also results in a reduction in the required processor throughput during fault diagnosis.

Another important feature of this invention is the connectivity algorithm which dictates how the each of the Q-DAGs are connected or exchange information after they are replicated. The connection between the third and second Q-DAG can be different from the connections between the first and second Q-DAGs. The connectivity information can take the form of a matrix which dictates how the individual subsystem Q-DAGs are connected, once they are replicated. In addition, each Q-DAG will have a data table that includes information on how different nodes of the Q-DAG are connected. The ability to replicate the stored Q-DAG plus the connectivity algorithm allows the host system computer to construct a Q-DAG for fault isolation of the entire host system.

The invention can be used in any host system having a central computer that relies on various inputs for fault diagnostics. It is particularly applicable to passenger entertainment systems on modern commercial aircraft such as the Boeing 747 and Boeing 777 by Boeing Company, which have a highly repetitive architecture and a maintenance computer with limited memory and throughput available for diagnostics. This on-line diagnosis allows for repair of host systems that are under strict turnaround repair requirements. In commercial aircraft, the systems often must be repaired while the aircraft is docked at a terminal. Using the new diagnostic system, if a fault is detected on one of the sub-systems, the embedded diagnostic system can isolate the likely faulty subsystem while the aircraft is in operation. Often the faulty subsystem can be repaired or replaced while the aircraft is in operation. In other cases the diagnostic system can be interrogated and the faulty subsystem can be quickly replaced, when the aircraft lands.

These and other further features and advantages of the invention will be apparent to those skilled in the art from the following detailed description, taken together with the accompanying drawings, in which:

DETAILED DESCRIPTION OF THE INVENTION

Figure 1:
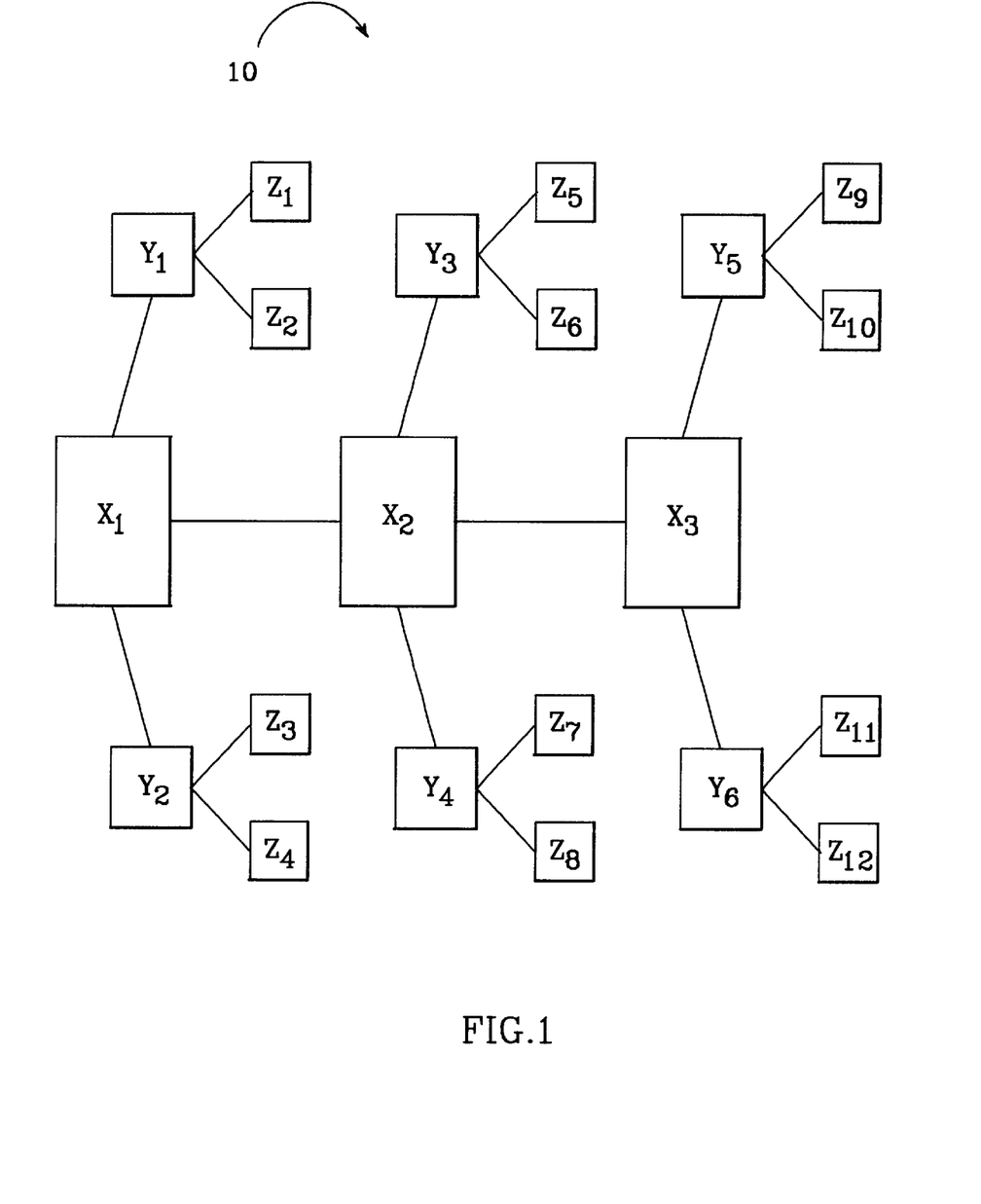
FIG. 1 is a block diagram of a typical host system having repetitive architecture.

The new diagnostic system is applicable to host systems having redundant architecture such as the system 10 shown in FIG. 1, in which the different blocks represent electrical subsystems. The system 10 comprises three identical subsystems $X_1$–$X_3$, each of which is connected to two of six identical Y subsystem $Y_1$–$Y_6$. Each Y subsystem is also connected to two of twelve identical Z subsystems $Z_1$–$Z_{12}$. Using the new diagnostic system, each class of Q-DAG (i.e. X, Y, and Z), the number of instances of the class, and the manner in which each Q-DAG is linked with instances of other Q-DAGS are specified. For example, class X appears as three instances $X_1$–$X_3$, each of which is linked with another instance of X, as well as two instances of Y. Class Y appears as six instances, each of which is linked with an instance of X and two instances of Z. Class Z appears as twelve instances, each of which is linked with an instance of Y.

Figure 2:
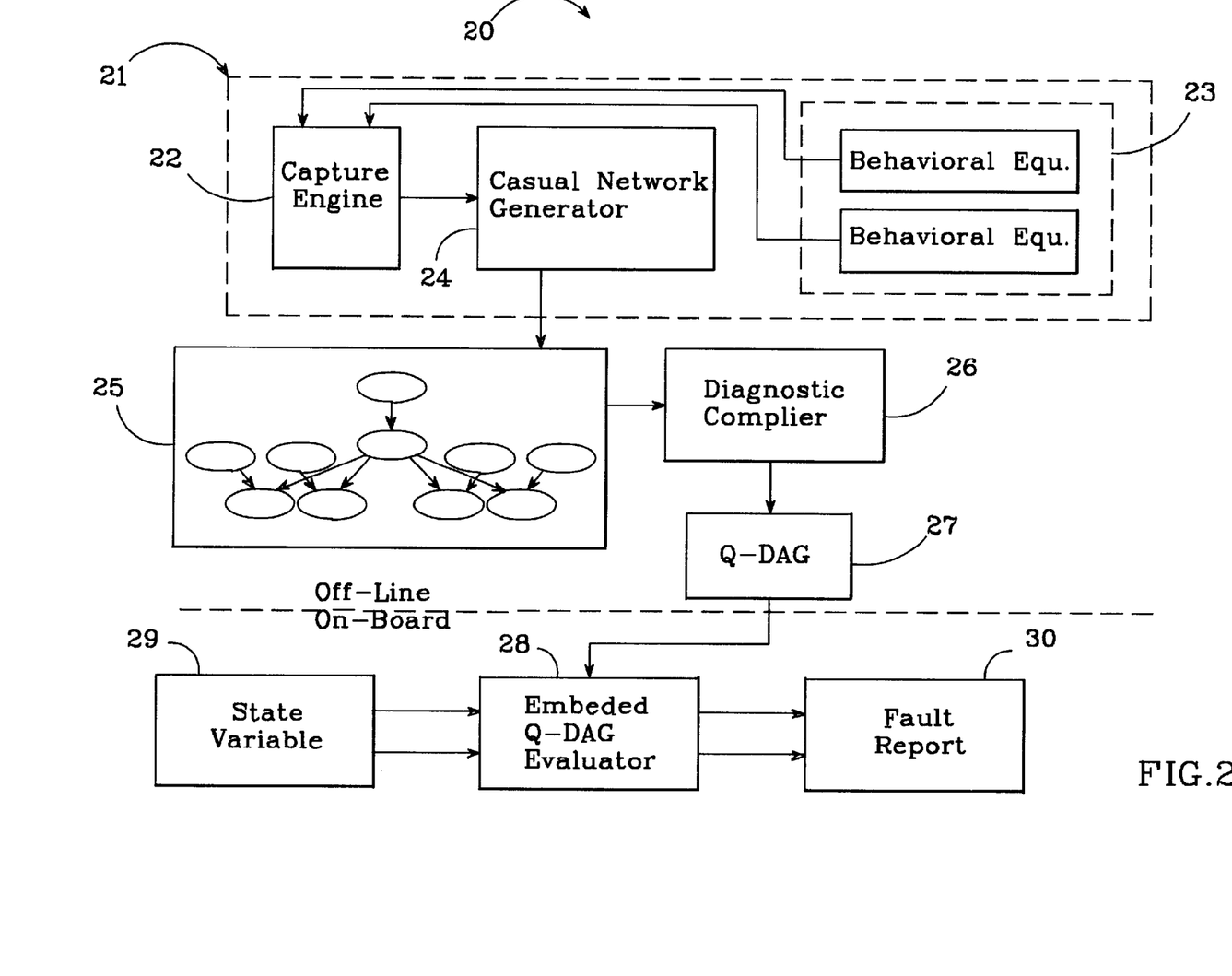
FIG. 2 is a block diagram of a system used to generate Q-DAGs from causal networks.

A Q-DAG must be generated for each of the subsystems X, Y and Z. As defined more fully below, a Q-DAG is a compiled representation of a causal network; FIG. 2 shows a preferred system 20 for generating a Q-DAG. The steps for generating a Q-DAG essentially include: developing a model of each sub-system, related bus structure and interconnections, applying a causal network inference to the model, generating a causal network representation based on behavioral characteristics of the sub-systems within the model, and compiling the causal network representation into a set of Q-DAG files which can be stored in the host system computer memory.

Figure 3:
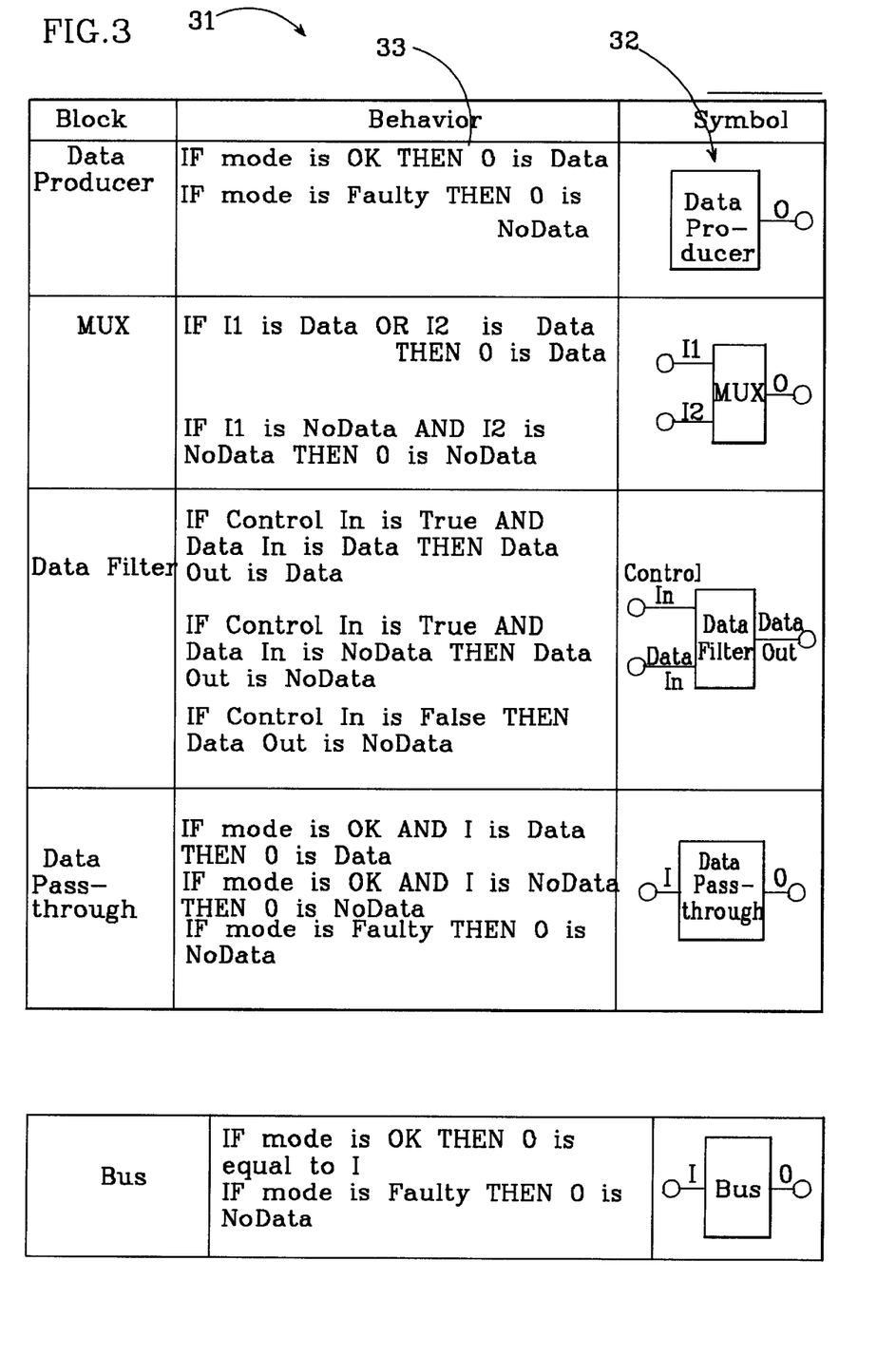
FIG. 3 is a chart of part of a component or subsystem library used by the system shown in FIG. 2 to generate a subsystem model.

To develop the system model, a data capture system 21 provides a graphical design interface for the capture of a system level block diagram and for analysis, simulation and integration. The data capture system includes a schematic capture engine 22 that enables development of a schematic view of the subsystem and its components. The schematic view can be input by manually selecting primitives or composite objects from a database library, or it can be automatically captured from a database using third party design tools. Database libraries 23 provide the primitives or compound objects designed specifically for the host system, and also behavioral equations describing the various primitives. FIG. 3 shows examples of primitives 31 that might be stored in a database library, with the library containing a graphical representation of the primitive 32 along with its behavioral equations 33. The equations relate to the input and/or output of the primitives when they are in operational or faulty mode. Depending on the level specified, the primitive object can be a gate, a bus, or a complex line replaceable unit (LRU; compound objects can be built from available primitive objects. Once built, the compound object may be stored in the libraries for archival purposes. The schematic model is developed by selecting primitives 30 and compound objects, and connecting each primitive 30 with buses or wires to define a repetitive block for the system.

Figure 4:
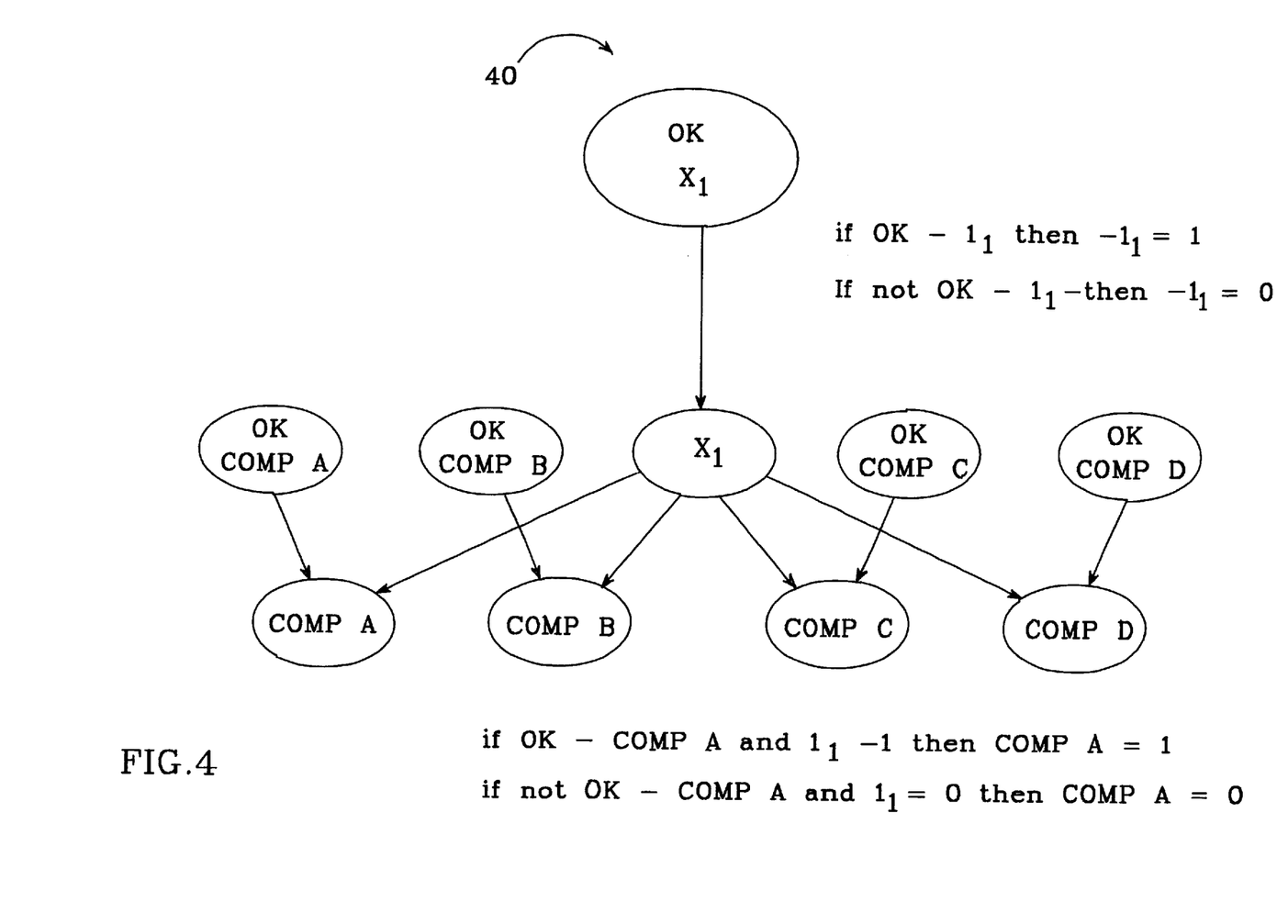
FIG. 4 is a graphical representation of a causal network for the subsystem generated by the system of FIG. 3 from the system model.

Once defined, the schematic model is passed to a causal network generator 24 which develops a causal network model based on behavioral characteristics provided with the schematic model. FIG. 4 is an graphical representation of a simplified causal network model 40, for the subsystem $X_1$ that includes four components COMPA–COMPD. The network 40 is based on the architecture of the underlying system (i.e. subsystems, LRUs, buses, etc.) as well as data flow information. The model shows the cause-effect relationship between subsystems and components along with a database that describes the individual behavior of each component in terms of inputs and outputs. The cause and effect relationships between nodes and parents may be Boolean logic or conditional probability descriptions. The causal network model can provide a ranked set of diagnosis for troubleshooting host system failures such as a "dead" subsystem, or host system faulty conditions such as subsystem timing related failures. These behavioral characteristics describe how the modeled subsystem should work under normal circumstances. Causal networks are more fully described in Darwiche, A. 1998. Model-based Diagnosis Using Structured System Descriptions. *J. of AI Research,* 8:165–222, June 1998.

Referring again to FIG. 2, the causal network is output from the causal network generator 24 and passed to a causal network inference system (CNETS) 25. The causal network model contains the required structures and algorithms for developing the associated causal network inference. CNETS 25 performs a domain-independent causal network inference mapping of the logic equations into network properties for each primitive. These logical equations can be either very simple or rather complex since CNETS 25 supports both Boolean logic and conditional probability relationships for modeling primitives.

Figure 5:
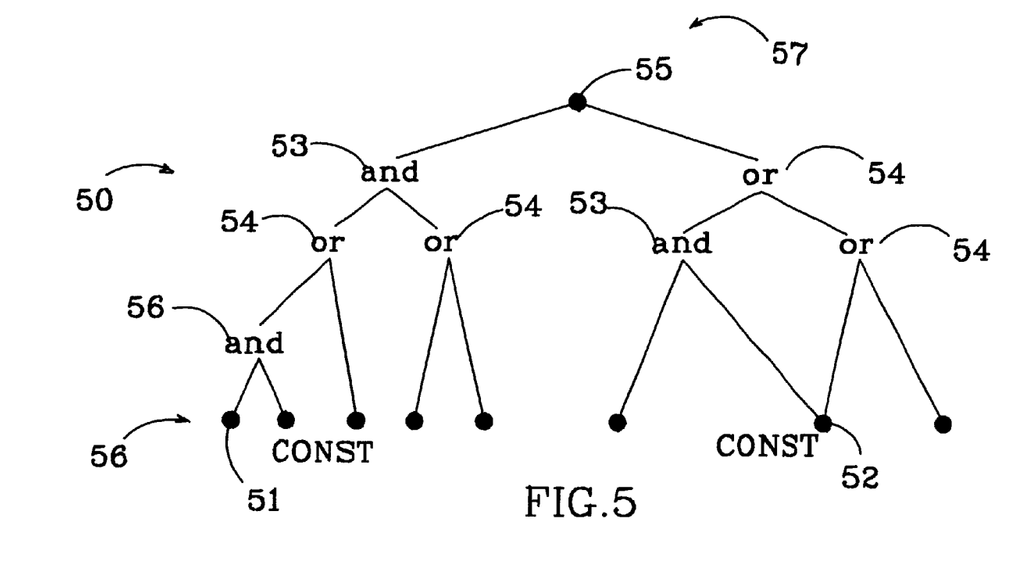
FIG. 5 is a graphical representation of the Q-DAG generated by the system of FIG. 3 from the causal network in FIG. 4.

When the causal network inference modeling is complete, the model is passed to a diagnostic compiler 26 which uses it to generate a compiled diagnostic code referred to as Q-DAG. FIG. 5 shows a graphical representation of a Q-DAG 50. Q-DAG generation is based on traditional algorithms for exact causal network inference, as discussed by the present inventors in the articles, Darwiche A. supra., and Adnan Darwiche, Gregory M. Provan: Query DAGS: A Practical Paradigm for Implementing BeliefNetwork Inference. *J. of AI Research* 6:147–176, 1997.

A symbolic causal network produces a Q-DAG 50 with an AND-OR tree. The probabilistic causal network produces a QDAG that is analogous to the symbolic QDAG, with the following differences: it has multiplication (*) operators at corresponding AND-nodes, addition (+) operators at corresponding OR-nodes, and has constant nodes as probabilities rather than assumables. The nodes of the tree structure can be classified into five different categories; Evidence Specific Nodes (ESN) 51, constant (CONST) nodes 52, AND nodes 53, OR nodes 54, and QUERY nodes 55. ESNs 51 contain information about measurable states and are set based on the current measured state of the system being diagnosed. For example, the node could indicate if a fault report is active or inactive, or if a monitor is set or cleared. CONST 52 nodes represent the assumable or mode variables of a causal network whose states are predefined or constant, and are the nodes that provide for the diagnostic conclusions. The ESN 51 and CONST 52 nodes will always be found at the leaves 56 of the Q-DAG. The AND 53 and OR 54 nodes are intermediate Q-DAG nodes that provide logical connectivity between the leaf nodes 56 and the root node 57. Finally, a QUERY node 55 is the root of the Q-DAG 50 and is typically a (+) node, but can also be a (*) node.

The tree structure of the Q-DAG 50 can be represented within a software program using a set of arrays. The main array is called an index array and stores the nodes and pointers to the other arrays. The nodes of the QDAG connected in a parent child relationship. For instance, a QUERY node only has child nodes. If hypothetical-node X is a parent to hypothetical node Y, the Y is the child of X. Since Q-DAGs are not always represented by binary trees, each node can have different numbers of children and parent nodes.

To handle this variability, the children and parents lists for each node are stored in two large arrays, called the children array and parents array, respectively. Separate parent and children arrays are used to store the list of parent and children nodes for each of the Q-DAG nodes. Each node in the index array will specify its starting point into these arrays, as well as the number of children and parents that belong to this node. The Q-DAG nodes have pointers into these arrays that specify the beginning and the ending positions for the respective children and parent lists.

Referring again to FIG. 2, the Q-DAG is then stored in host system memory as an embedded evaluator 28 which accepts state variables 29 from the host system to evaluate the Q-DAG. It then generates a fault report 30 identifying the likely faulty subsystem/component.

Figure 6:
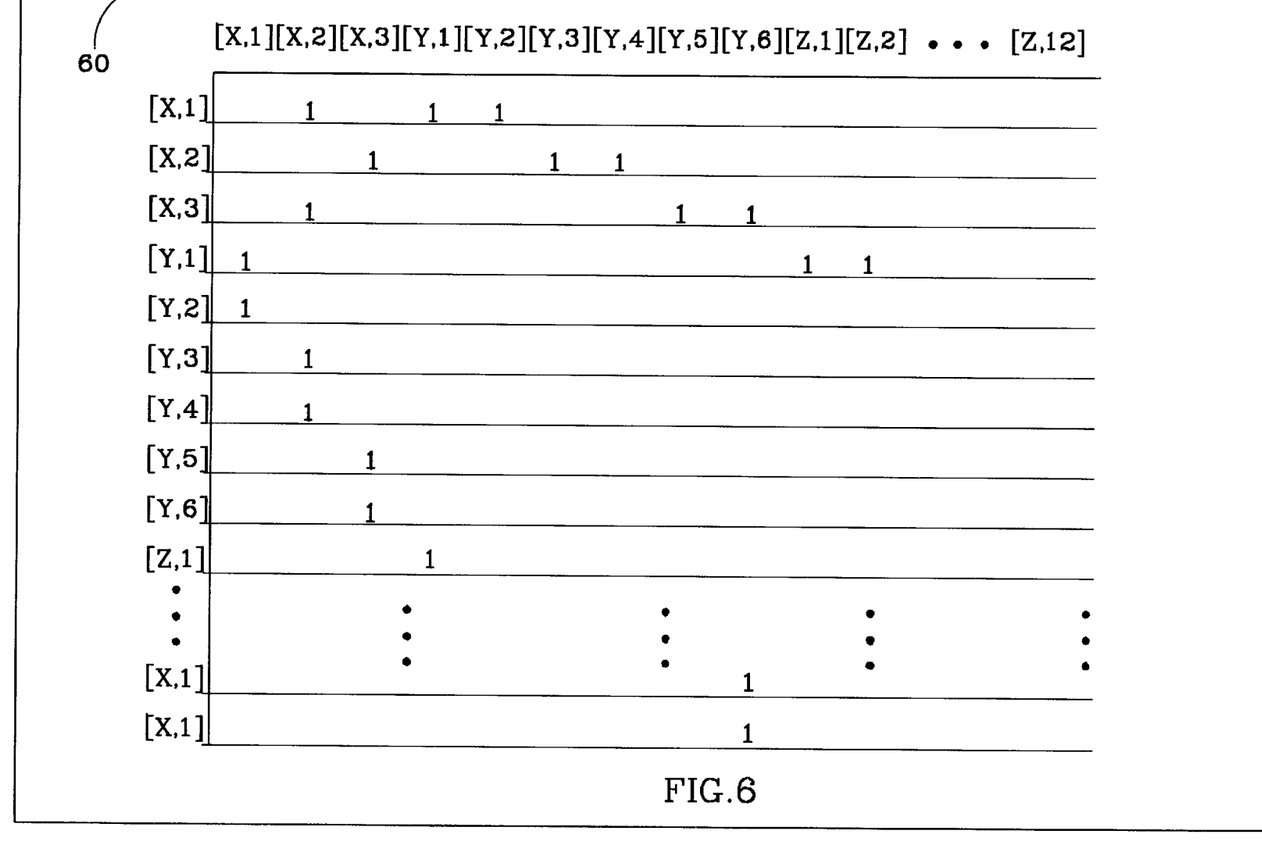
FIG. 6 is a matrix containing the information on which subsystems are connected.

Once the X, Y, and Z subsystem Q-DAGs are formed, an incident matrix must also be created to provide information on how the various subsystems are interconnected. This information is necessary for linking the Q-DAGS once they are replicated. FIG. 6 shows an example of a matrix 60 for the system of FIG. 1, which is created using the parameters [i,j] where i denotes the component X, Y, or Z, and j denotes the instance of the component. A 1 in the matrix denotes a configuration link or connection between the particular Q-DAGs. The matrix is represented as a binary (0,1) matrix in the software. The system Q-DAG can now be represented in terms of the set of component Q-DAGs X, Y, and Z, plus a data table which gives the configuration matrix in FIG. 6.

Figure 7:
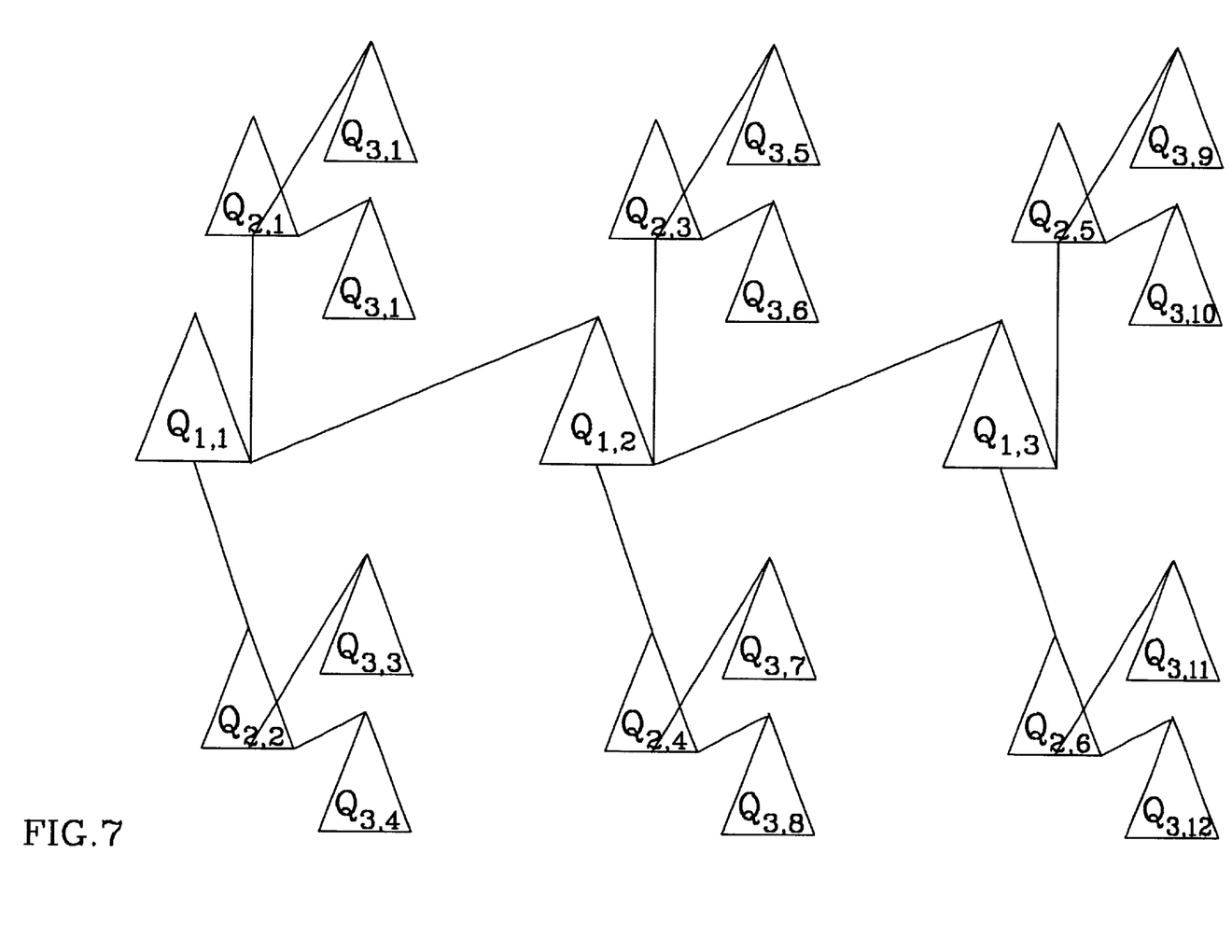
FIG. 7 is graphical representation of the host system Q-DAG after the subsystem Q-DAGs are replicated and after the matrix information is incorporated.

The data table will also include Q-DAG level information which goes beyond the matrix information on which Q-DAGs are linked, and provides specific information on the actual Q-DAG nodes. For every instance of a Q-DAG class, the Q-DAG level information includes data on both the query nodes and ESN nodes, including values and instantiations of these nodes, whether these nodes are linked to nodes in other instances, and weights assigned to ESN nodes. The data table for Q-DAG class X is referred to as $T_x$; FIG. 7 graphically illustrates the contents of CMC memory for each of the particular subsystems X, Y, and Z. $Q_1$, $Q_2$, and $Q_1$ represent the Q-DAGs for subsystems X, Y, and Z, respectively. $T_1$, $T_2$ and $T_3$ represent the data table for subsystem X, Y, and Z, respectively. The lines between the data tables is a graphical representation of the interconnections between the subsystems and Q-DAG nodes.

The memory space required by the data table is dependent on the number of instances of the particular Q-DAG and the number of query nodes and ESN nodes. Connectivity among Q-DAG instances is thus specified at the table level in terms of instances of query and ESN nodes, rather than in terms of connectivity of Q-DAGs themselves. Thus, in representing the system of FIG. 1 the diagnostic system is composed of component Q-DAGs for classes X,Y and Z, matrix information for linking all of their instances and a data table which includes node information for each instance.

By storing just one Q-DAG for every class rather than one Q-DAG for every instance, the memory needed for the new diagnostic system is greatly reduced. For example, in a system with 400 copies of a class 1 each requiring 200 kB of memory and 200 copies of a class 2 each requiring 300 kB of memory, the traditional approach requires 140 MB. The new approach requires 0.5 MB, a savings of over two orders of magnitude.

Figure 8:
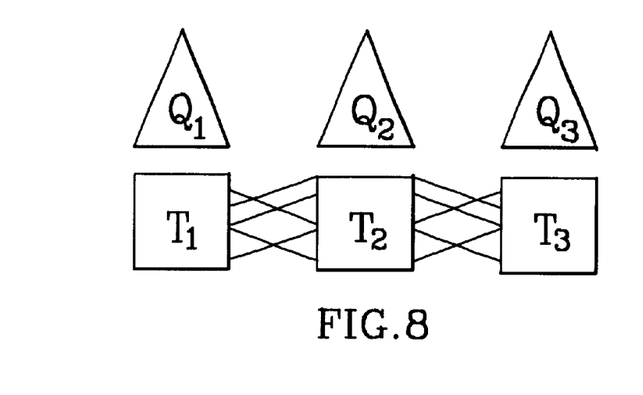
FIG. 8 is a graphical representation illustrating the subsystem Q-DAGs and data tables stored for the host system in FIG. 1.

Evaluating Q-DAGs is a relatively simple task for the host systems central/maintenance computer. Prior to operation of the host system, the subsystem Q-DAGs and corresponding data tables are stored in the central computer's memory. System evidence variables are obtained as inputs and are passed in real time to the computer, which uses the ESNs during Q-DAG evaluation. The central computer then replicates the subsystem Q-DAGs. It can either replicate enough Q-DAGS to represent the entire host system or only enough subsystem Q-DAGs to diagnose the particular fault signal. Once the Q-DAGs are replicated, the data table information is accessed to provide the data connecting the various instances. The resulting system Q-DAG is graphically shown in FIG. 8; the arcs linking the Q-DAGs represent physical connections, as denoted by the configuration matrix in FIG. 6.

Depending on how information is transferred between various subsystems, the new diagnostic system could replicate less that all of the subsystems during fault isolation. For example, if a fault were detected at $X_2$, the diagnostic system could conduct its fault isolation after replicating $X_1$ into $X_2$, $Y_1$ into $Y_2$–$Y_4$, and $Z_1$ into $Z_2$–$Z_8$, and incorporating the data table information.

Once the system Q-DAG is constructed, it is evaluated based on the system/fault information sent to the central computer. Each assumable node in the Q-DAG has a weight associated with it, which is used in the diagnostic processing. This weight is either based on the measured states of the system, or calculated based on its children's weight. The weights correspond to failure likelihoods expressed as integers rather than probabilities. There is a predetermined correspondence between the weights and probabilities.

The CONST nodes use a constant weight equal to their reliability weight. The ESN nodes set their weights based on the measured states of the system. Thus, if the measured state is the same as the state associated with this node, its weight is set to true. Each measured variable (e.g. fault report) can be set to multiple states such as active or inactive, so if a fault report active ESN node is set to true, then the corresponding report inactive ESN nodes relating to that variable must be set to false. If the state of the measurable variable is unknown, then all ESN nodes associated with that variable are set to true. The weights are then propagated up the tree to the QUERY nodes by adding the children weights for AND nodes and taking the minimum weight of the children for OR nodes. Given this generalized structure, the evaluator uses the data tables to follow the link-variables from one Q-DAG class to another, thereby evaluating the entire system Q-DAG, which is represented implicitly by the class Q-DAG structures and data tables.

The Q-DAG evaluator then generates a failure report listing possible faulty sub-systems. The failure report can either be displayed on a monitor or stored in an electronic storage/retrieval device for access during maintenance periods.

Figure 9:
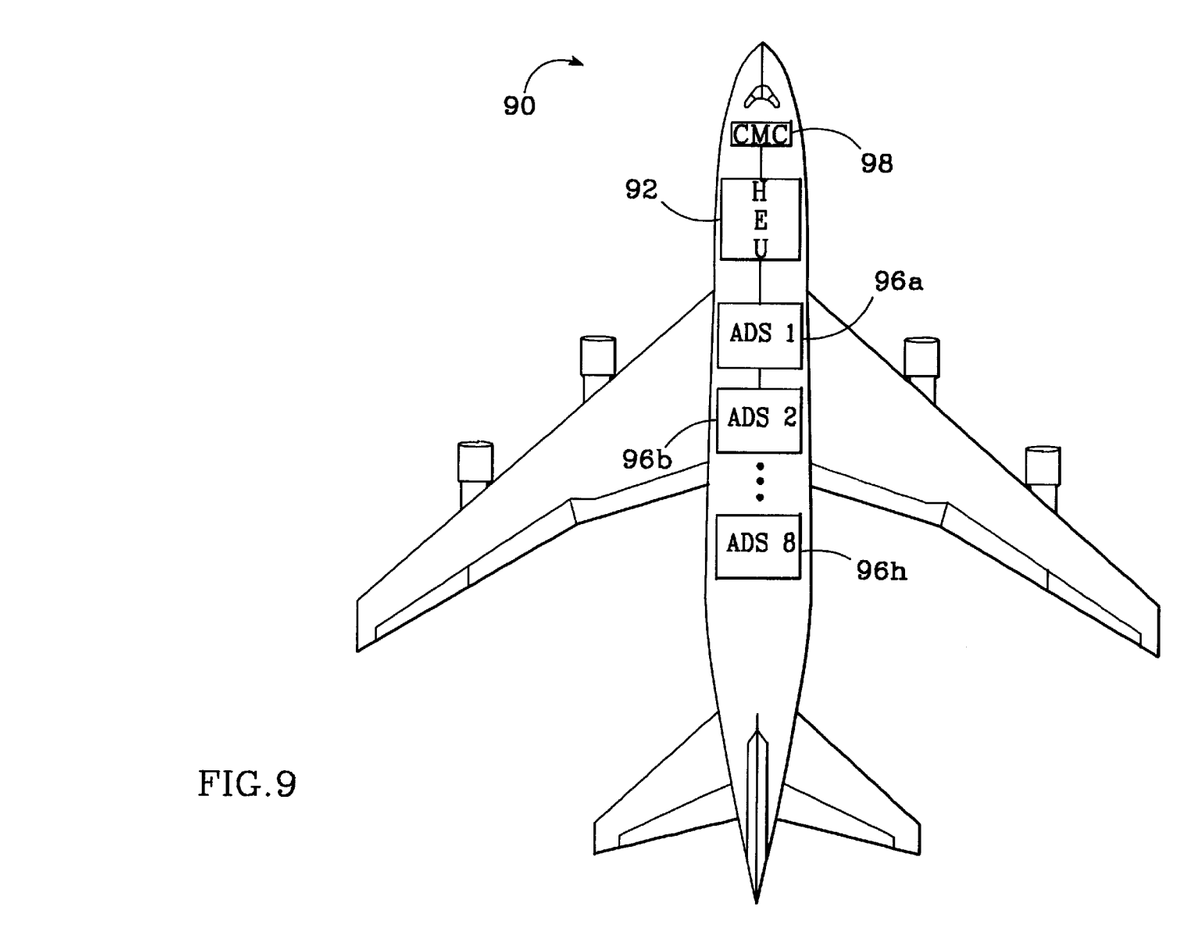
FIG. 9 is a simplified block diagram of the Total Entertainment System (TES) for a modern commercial aircraft.

The new diagnostic system can be used in many different types of host systems having repetitive subsystems, but is particularly applicable to aircraft entertainment systems. FIG. 9 shows a Total Entertainment System (TES) 90 for commercial aircraft such as the Boeing 747 and 777. The TES has a repetitive architecture that essentially comprises a Head End Unit (HEU) 92 and up to eight identical Area Distribution Systems ADS1–ADS8. The diagnostics system in the TES also relies on a central maintenance computer (CMC) 98 which has computer memory for storing the new diagnostic software and a processor for accepting fault information and executing the new diagnostic software.

In operation, the HEU 92 accepts numerous inputs such as audio/video media, a landscape camera, or passenger information and distributes video/audio information throughout the aircraft on a bus 94 to ADS1–ADS8, with ADS1 receiving the audio/video information before the following ADSs, ADS2 receiving the information before the following ADSs, etc. The information is then distributed within each ADS to 105 individual passenger seats. Each ADS has identical subsystems or LRUs, and each has identical bus and wire interconnections.

Figure 10:
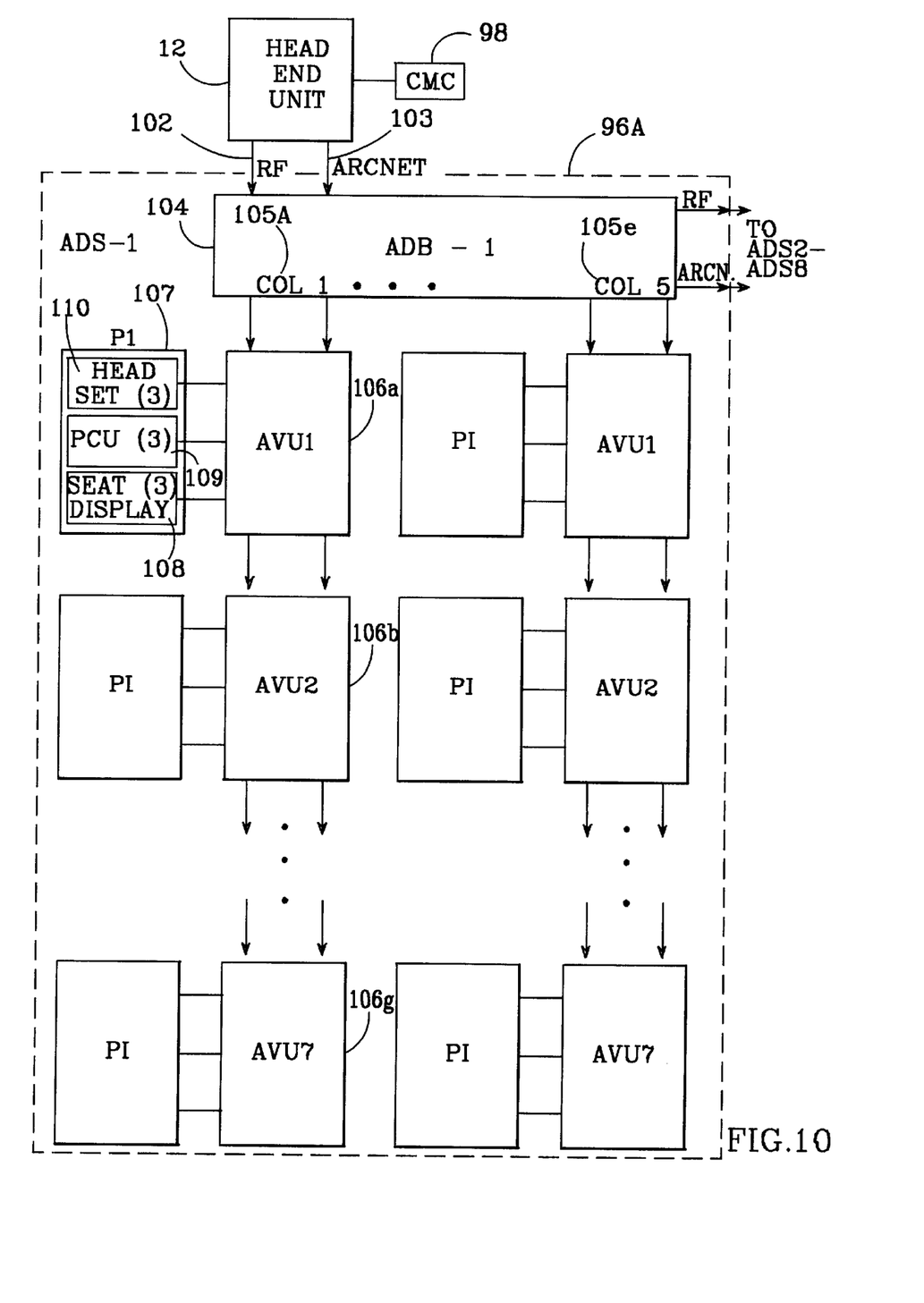
FIG. 10 is a more detailed block diagram of the TES shown in FIG. 9.

FIG. 10 shows a block diagram of the HEU and the internal subsystems and interconnections of ADS1, which also has repetitive architecture. The HEU 92 distributes the audio/video information over an RF line 102 and an Arcnet 103 to an Area Distribution Box (ADB) 104. At the ADB 104 the information is distributed to five columns 105a–105e, each of which distributes the information to seven audio video units (AVUs) 106a–106g. Each AVU then distributes the audio/video information to a passenger interface (PI) 107 which distributes the information to 3 passenger seats. Each passenger seat has a seat display 108, a passenger control unit (PCU) 109, and a headset 110. Each of the ADSs that follow ADS1 has the same subsystems and interconnections as shown in FIG. 9.

Thus, the overall TES comprises one HEU, up to eight ADBs, up to 280 AVUs and 280 PIs. Using the new diagnostic system, one Q-DAG for each of the repetitive subsystems is developed as described above using the system shown in FIG. 2. This includes Q-DAGS for the HEU, one ADB, one AVU and one PI. A data table is then developed for each Q-DAG which includes matrix information dictating how the different Q-DAGs are linked and the Q-DAG level information on the Q-DAG nodes and how they are linked. Accordingly, only four Q-DAGs need to be stored in memory along with their corresponding data table information. Traditionally, an overall TES Q-DAG would include all 569 subsystems.

The CMC 98 is dedicated to accepting and diagnosing system faults. In other embodiments, the CMC 98 could be part of a flight computer tasked to perform other aircraft functions, such as navigation. The CMC 98 generally includes a central processor for executing the diagnostic program, program memory for storing the diagnostic program, inputs for receiving operational or performance data and information from the subsystems. The CMC 98 also preferably includes a magnetic or optical storage/retrieval device such as a disk drive or CD ROM drive, and an on board visual display such as a liquid crystal display (LCD) or video display.

The four Q-DAGs Wand their data tables are stored in CMC memory along with a replicating program. The CMC 18 obtains real-time information from sensors associated with each subsystem within the TES and converts the information to state variables. These state variables can reflect the operational health of the subsystems. The Q-DAG files provide the diagnostics necessary to identify the faulty subsystem based on the state variables received by the CMC. Upon receipt of system information, the CMC replicates the necessary number of Q-DAG instances and incorporates the data table information for each Q-DAG. The Q-DAG is then evaluated and a report indicating the likely faulty subsystem is stored in CMC memory of displayed.

In the TES, video and audio information is sent serially to the ADS. As a result, all of the subsystems do not need to be replicated to perform the diagnostic analysis. For example, if a fault is detected in the fifth ADS block, four ADB Q-DAGs are replicated from the ADB Q-DAG stored in memory. The stored AVU and PI Q-DAGs are each replicated 174 times. The matrix and Q-DAG level information is accessed to provide the Q-DAG linking data. Using the newly constructed Q-DAG which covers ADS1–ADS5, a determination is made as to whether the fault detected in ADS5 was the result of a fault at ADS5 or the result of a fault at one of the previous ADSs. Thus, the Q-DAG evaluator conducts an "up-stream" diagnosis prior to diagnosing the fifth Q-DAG.

Figure 11:
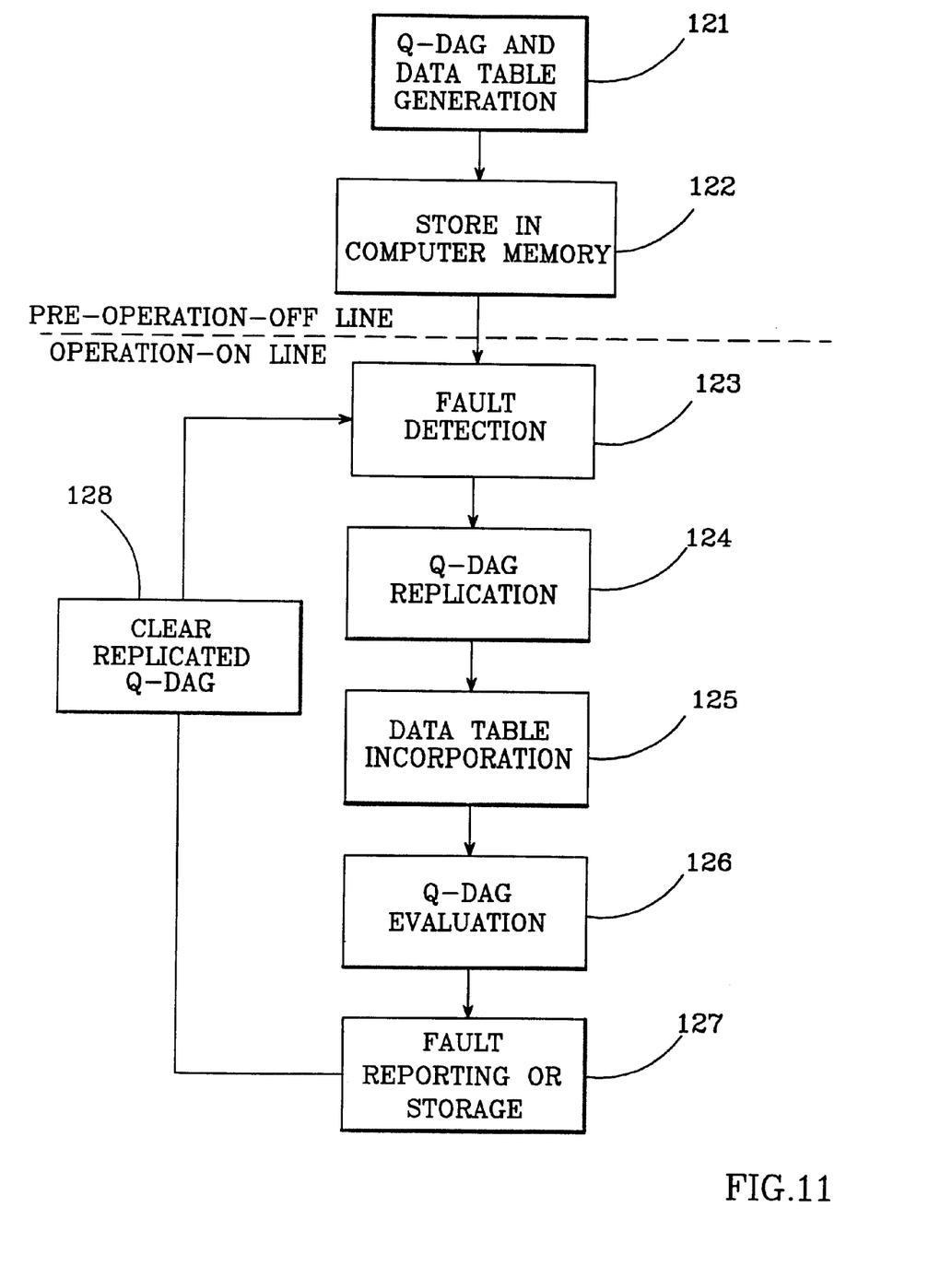
FIG. 11 is a flow diagram for the new fault diagnostic system.

FIG. 11 shows a flow diagram for the invention both off line and on line. In the first step 121, the Q-DAG is generated off-line by the system 20 shown in FIG. 2 and the corresponding data table is generated. In the next step 122, the Q-DAGs and data tables are stored in the host system memory, usually the CMC memory. In operation, the CMC detects a fault 123 and then replicates the necessary number of Q-DAGS 124. The data table information is then accessed 125 to create a system Q-DAG. The Q-DAG is evaluated 126 using the fault variables detected and a list of likely faulty subsystems is displayed on the host system display or stored in memory 127 for later retrieval by maintenance crews. When this sequence has been completed, the generated Q-DAG information is cleared until another fault is detected, at which time the operation is repeated. This process could also be completed on a predetermined maintenance interval. By clearing the Q-DAG, the diagnostic system preserves valuable computer memory.

Although the present invention has been described in considerable detail with reference to certain particular configurations thereof, other versions are possible. Therefore, the spirit and scope of the appended claims should not be limited to their particular embodiments described.

We claim:

1. A computer based embedded real time diagnostic system for use in a host system having multiple types of repetitive subsystems, comprising:
   a computer that is part of said host system, for executing programs;
   a computer memory that is part of said host system, for storing programs;
   a diagnostic inference program for each type of repetitive subsystem, said program stored within said memory and executable by said computer for enabling said computer to generate a diagnostic inference in response to fault data from said subsystems;
   a replicating program stored in said memory and executable by said computer for enabling said computer to replicate said diagnostic inference program to conduct a diagnostic inference of other repetitive subsystems in response to fault data for said other subsystems; and
   a connectivity program stored in said memory and executable by said computer for enabling said computer to dictate how said replicated diagnostic inference programs communicate with other said diagnostic inference programs.

2. The system of claim 1, wherein said diagnostic inference program comprises a query directed acyclic graph (Q-DAG).

3. The system of claim 1, wherein said system comprises an aircraft entertainment system.

4. The system of claim 1, wherein said connectivity program dictates how said replicated diagnostic inference programs communicate based on how said multiple types of repetitive subsystems are connected and communicate in said host system.

5. A computer program product for use in a system having at least one type of repetitive subsystem, said computer product comprising:
   a computer usable medium that is part of said system and having a computer readable program code embedded in said medium for detecting faults and generating a report of the likely cause of said faults, said program code comprising:
      a computer readable program for conducting a diagnostic inference on one of each of said type of repetitive subsystem;
      a computer readable program for replicating said diagnostic inference program, in response to a fault signal from one of said subsystems, a sufficient number of times for a diagnostic inference to be made to determine the likely cause of said fault signal; and
      a computer readable program for dictating how said diagnostic inference program and said replicated diagnostic inference programs communicate with each other.

6. The computer product of claim 5, said diagnostic inference program is a query directed acyclic graph (Q-DAG).

7. The computer product of claim 5, wherein said system having repetitive architecture is an aircraft entertainment system.

8. A diagnostic computer program stored on a computer readable medium to detect and isolate faults in a system having repetitive subsystems, comprising:
   a computer readable diagnostic inference program for causing a computer to generate a diagnostic inference in response to fault data from a first of said repetitive subsystems;
   a computer readable replicating program for causing said computer to replicate said diagnostic inference program when a fault is detected at one of said repetitive subsystems other than said first repetitive subsystem; and
   a computer readable connectivity program for causing said computer to dictate how said replicated diagnostic inference programs communicate with each other and with said diagnostic inference program, said programs residing in said system having repetitive subsystems.

9. The computer program of claim 8, wherein said replicating program replicates said diagnostic inference program only a sufficient number of times to allow said computer to detect and isolate the cause of said fault from said other subsystem.

10. The system of claim 8, wherein said diagnostic inference program comprises a query directed acyclic graph.

11. The system of claim 8, wherein said system is an aircraft entertainment system.

12. The system of claim 8, wherein said connectivity program dictates how said replicated diagnostic inference programs communicate based on how said multiple types of repetitive subsystems are connected and communicate in said host system.

13. A method for detecting and isolating faults in a host system having repetitive subsystems, comprising:

storing a diagnostic inference program in said host system representing one of said repetitive subsystems, said inference program used to determine the cause of faults in said subsystems;

detecting a fault in one of said repetitive subsystems;

replicating said diagnostic inference programs a sufficient number of times to determine the cause of said fault, said replicating based on the architecture of said host system;

generating the necessary connectivity algorithm to connect said replicated diagnostic inference programs allowing them to communicate with each other and said diagnostic inference program, based on how said repetitive subsystems communicate with each other in said host system;

evaluating said diagnostic inference programs based on said detected faults to determine which of said repetitive subsystems is the likely cause of said faults; and generating a report of the cause of said faults.

* * * * *